Nov. 26, 1935.  H. A. DEPEW  2,021,991
APPARATUS FOR THE TREATMENT OF PIGMENTS
Original Filed June 19, 1933
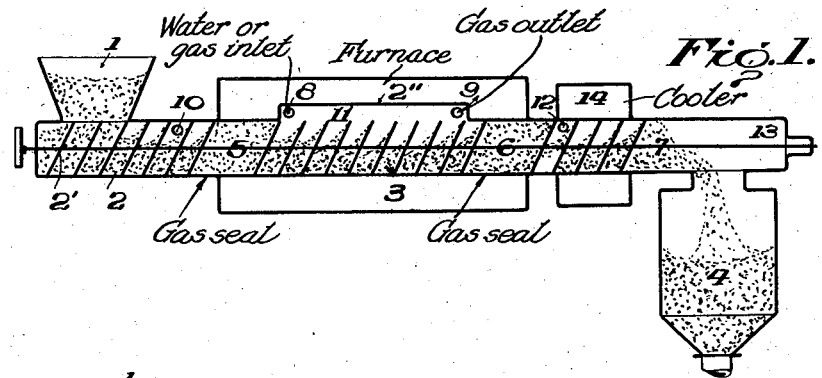
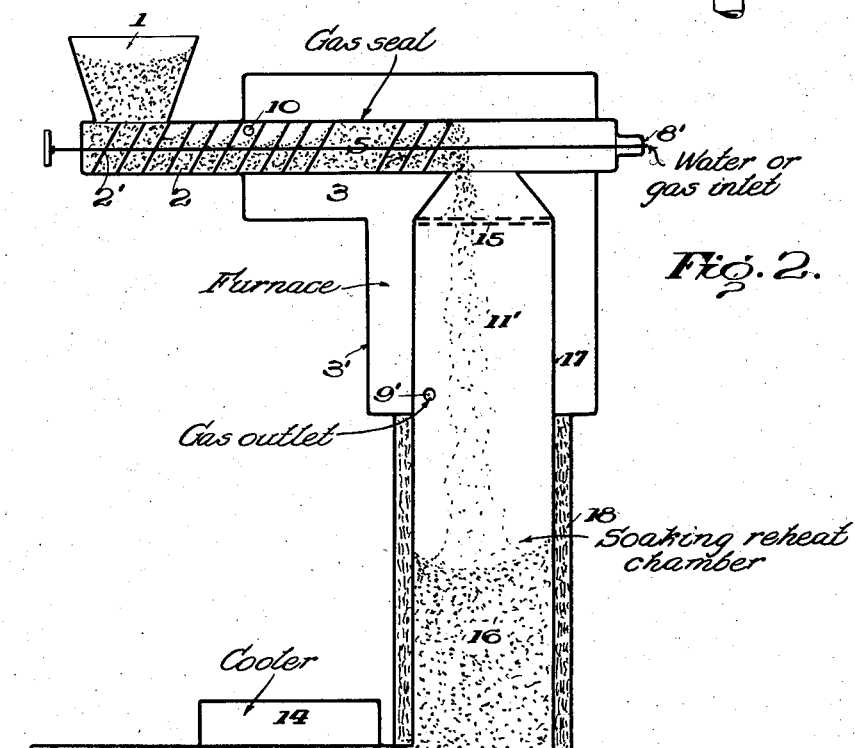
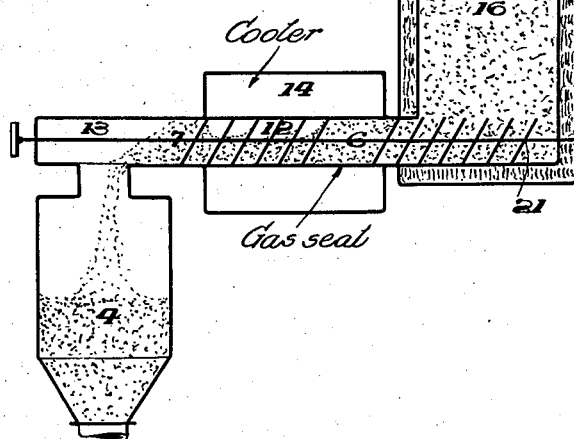
Inventor
Harlan A. Depew
By Cameron Kerkam & Sutton
Attorneys Patented Nov. 26, 1935

2,021,991

UNITED STATES PATENT OFFICE 2,021,991

APPARATUS FOR THE TREATMENT OF PIGMENTS

Harlan A. Depew, Columbus, Ohio, assignor to American Zinc, Lead & Smelting Company, St. Louis, Mo., a corporation of Maine Original application June 19, 1933, Serial No. 676,590. Divided and this application November 2, 1933, Serial No. 696,442

6 Claims. (Cl. 23—277)

This invention relates to furnaces or mufflers for the treatment of pigments and is a division of my application Serial No. 676,590, filed June 19, 1933. When zinc sulphide pigment, for example, is made by the reaction of zinc vapor and sulphur vapor, the product may contain some free sulphur, zinc and zinc oxide and even some carbon, as well as some absorbed tars and gases. Furthermore, the particle size may be so fine as to be undesirable for some uses.

The object of the present invention is to provide a muffling furnace capable of being operated to remove various impurities from certain classes of pigments and, if desired, increasing the particle size of the pigment, all without subjecting the pigment to the action of moisture.

The inventive idea is capable of being embodied in a variety of forms, two of which are illustrated in the accompanying drawings, but such drawings are to be understood as illustrations only, and not as defining the limits of the invention, reference being had to the appended claims for this purpose.

In said drawings:

Fig. 1 is a diagrammatic view of an apparatus for continuously passing pigment first through a muffling furnace and thence onward through a cooler from which it is delivered into a suitable bin.

Fig. 2 is a diagrammatic view of a modification in which provision is made for effecting a soaking reheat of the pigment after it passes through the muffle proper and before it is subjected to the action of the cooler.

Referring to the drawings, in which like reference numerals indicate like parts throughout the several views, and first to Fig. 1, reference numeral 1 indicates any source of pigment, as a hopper, into which the pigment may be fed in the usual or any suitable manner; 2 indicates a closed conduit within which operates a power-driven screw 2', and the hopper 1 delivers the pigment into the conduit 2 along which it is advanced by the screw 2'. A suitable furnace 3 surrounds a portion of the conduit 2, and thus effects the heating of that portion of the conduit within the furnace and of the pigment during the time it is being advanced through the furnace 3. As here shown, the upper portion of the conduit 2 within the furnace 3 is somewhat enlarged as at 2" and an inlet 8 is provided at one end of said enlargement 2" and an outlet 9 at the other end thereof. At point 5 in the conduit 2, where the pigment enters the furnace 3, and at point 6 in said conduit, where the pigment leaves the furnace 3, the screw 2' has a portion of the thread omitted, and by the operation of the apparatus the pigment packs at the points 5 and 6 leaving a space 11 between said points and within the furnace through which the pigment is advanced by the screw, but without entirely filling the space. Immediately beyond the point 6 in the conduit 2, the said conduit is surrounded by a suitable water jacket 14 for quickly cooling the pigment as it passes through said jacket. Water is admitted into the chamber 11 through the inlet 8, and by reason of the temperature within said chamber (400° C.–900° C. depending on individual considerations) this water is immediately converted into gas at high pressure, which gas comes in contact with the pigment as it passes through the chamber 11 and then leaves said chamber through the exhaust 9. Other suitable inert gas or gases, such as $CO_2$, that is reactive with carbon, or non-oxidizing flue gas may be used in place of the water gas. The water vapor in the chamber 11, due to a slight pressure, tends to pass out of said chamber at the entrance end of the furnace and the exit end thereof. Such exit of the gas at either one of these points into the cooler parts of the conduit 2 would result in a condensation of moisture on the pigment within the conduit 2. The packed masses of pigment at the points 5 and 6 constitute seals to prevent this exit of the vapor from the chamber 11 at these points. In some cases it is desirable to reenforce the pigment seals by introducing inert gas under pressure into the conduit 2, to the rear of the pigment seal 5 and in advance of the pigment seal 6, through suitable inlets 10 and 12. The pressure of this inert gas is so adjusted as to effectively prevent the exit of the water vapor from the furnace 3 and its consequent condensation in the form of moisture on the pigment on the exterior of the furnace.

If desired, volatile materials or substances that will react to produce volatile materials may be added at 10 or at the hopper 1 to reenforce the seal at 5.

The thread may be removed from the screw 2' at the point 7 just beyond the cooler 14, thus forming a pigment seal at this point for the inert gas that enters the conduit 2 at 12. The packing of the pigment in the hopper 1 enables the pressure of the gas entering at point 10 to be maintained at that point. After the pigment passes the cooler 14 and the seal at point 7, it is discharged into a suitable container 4 from which it may be removed either periodically or continuously from the bottom.

In some cases a chemical that will act to produce gas pressure may be added to the pigment being treated before it reaches the seal 5 and the gas pressure thus secured will help in maintaining the seal at said point. Thus, for example, when zinc sulphide pigment is being treated in the muffler, sulphur may be added to the zinc sulphide and when the pigment enters the heating zone at 5, one of the reactions that takes place is

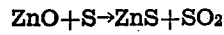

$$ZnO+S \rightarrow ZnS+SO_2$$

and the $SO_2$ aids in maintaining the seal at the point 5. Inert gas that may be introduced at point 10, if found necessary, enables the pressure to be maintained at the rear of seal point 5 equal to or slightly superior to the pressure in 11, and thus prevents the water vapor from passing from 11 to the rear of seal 5 and being condensed upon the pigment, and thus the water vapor or other inert gas in the chamber 11 is forced to leave at the exit point 9, together with the excess sulphur vapor, $SO_2$, and absorbed gases.

The water jacket 14 makes it possible to rapidly cool the pigment. If the sole purpose of the heating is to refine the pigment by removing impurities therefrom, a relatively low temperature and short time before cooling is sufficient, but if it is to be desired to increase the size of the particles a higher temperature and a longer time in the heated conduit may prove desirable. Fig. 2 is a diagrammatic view of a modified form of the apparatus that is particularly serviceable for this purpose. The arrangement in this figure is essentially the same as in Fig. 1 except that the screw 2' discharges the pigment into a tall tower 17 constituting a continuation of the conduit, a sliding screen 15 causing the pigment to fall in a dispersed cloud through the upper portion 11', where the reactions of the impurities with the water vapor or other gas and the distillation of impurities is completed. Preferably the upper portion 11' of the tower 17 is enclosed in a downward extension 3' of the furnace 3, and the lower portion of the tower is suitably insulated, as at 18. The hot pigment is allowed to collect at 16 in the bottom portion of the tower. A second screw 21 continuously advances the pigment from the bottom of the tower past the seal 6, through the cooler 14, and past the seal 7, and deposits it in the bin 4. The upper portion 11' of the tower 17 is maintained at a temperature above 100° C., and preferably from 400° C. to 900° C. and this immediately converts the water entering at 8' into dry steam which passes downward through the falling pigment and out through the exit 9'. Owing to the high temperature of the pigment no steam condenses as moisture thereon and the hot pigment at 16 thus remains in the same dry condition in which it was before treatment.

The apparatus is so operated that the hot pigment in the insulated bottom portion of the tower is always at a considerable depth, as shown in Fig. 2, with the result that the pigment is retained in its highly heated condition (400° C. to 900° C.) and in an inert atmosphere for a considerable time. This is technically known as, and is herein referred to as, a "soaking reheat". Such a soaking reheat results in a material growth or increase in size of the pigment particles and is only resorted to when such increase is desired.

It will be readily appreciated that either of the forms of apparatus shown can be operated at a relatively low temperature and the pigment exposed thereto for a short period of time required when it is merely desired to refine the pigment by the removal of impurities; or, if it is desired to increase the size of or "grow" the particles (and perhaps remove impurities) a higher temperature may be employed and the pigment remain under treatment for a longer period of time, as may be desired.

It will also be understood that the apparatus may be employed in the treatment of such pigments as lithopone, zinc sulphide and zinc oxide made in a wet way and dried and disintegrated before introduction into the hopper. Moreover, the bin 4 may be omitted and the pigment discharged directly into the air.

What is claimed is:—

1. In a muffling apparatus, the combination of means supplying material to be treated, a cooler, a conduit extending from said supply means to and through the cooler, a furnace between said supply means and cooler and surrounding a portion of said conduit, screw means extending into the furnace and advancing material to be treated from said supply means along said conduit and through said cooler, said screw means having a portion of the screw thread omitted adjacent the points where the conduit enters said furnace and cooler, whereby gas seals are effected by the material under treatment, and said conduit being provided with an entrance and an exit for gaseous material between said seals.

2. In a muffling apparatus, the combination of means supplying material to be treated, a cooler, a conduit extending from said supply means to and through the cooler, a furnace between said supply means and cooler and surrounding a portion of said conduit, screw means extending into the furnace and advancing material to be treated from said supply means along said conduit and through said cooler, said screw means having a portion of the screw thread omitted adjacent the points where the conduit enters said furnace and cooler, whereby gas seals are effected by the material under treatment, said conduit being provided with an entrance and an exit for gaseous material between said seals, and a soaking reheat chamber forming a part of said conduit and located between said furnace and the exit seal.

3. In a muffling apparatus, the combination of a furnace, means supplying material to be treated at one side of said furnace, a cooler at the other side thereof, a conduit extending from said supply means through said furnace and said cooler, said conduit having an enlarged portion within the furnace, a screw in said conduit extending from said supply means to and through the furnace and advancing the material to be treated from said supply means through said conduit, said screw having a portion of its thread omitted adjacent the points where it enters and leaves said furnace and cooler, whereby gas seals are formed by the material, and said enlarged portion of the conduit being provided with an entrance and an exit for gaseous material between said seals.

4. In a muffling apparatus, the combination of means supplying material to be treated, a cooler, a continuous conduit from said supply means through said cooler, a furnace between the supply means and the cooler and serving to heat said conduit, a two part screw means, one part extending into the furnace and advancing the material into the furnace and the other part extending through and advancing the material through the cooler, said screw means having a portion of the screw thread omitted adjacent the entrance to the furnace and adjacent the entrance to the cooler, whereby gas seals are formed by the material at said points, and an entrance and an exit for gaseous material into said conduit between said seals.

5. In a muffling apparatus, the combination of means supplying material to be treated, a cooler, a conduit extending from said supply means to and through said cooler, a furnace between said supply means and cooler and surrounding a portion of said conduit, screw means in said conduit and extending through the furnace and cooler, said screw means having portions of the screw thread omitted at points within the furnace where the conduit enters and leaves the furnace, whereby gas seals are effected by the material under treatment, and said conduit being provided with an entrance and an exit for gaseous material between said seals.

6. In a muffling apparatus, the combination of means supplying material to be treated, a cooler, a cylindrical conduit extending from said supply means to said cooler, a furnace between said supply means and cooler and surrounding a portion of the conduit, said conduit having an upper enlargement within the furnace, screw means in said conduit and extending through the furnace to the cooler, said screw means having portions of the screw thread omitted at points within the furnace where the conduit enters and leaves the furnace, whereby gas seals are effected by the material under treatment, and said conduit being provided with an entrance and an exit for gaseous material in said enlargement.

HARLAN A. DEPEW.